April 25, 1933.    A. A. MAGRI    1,905,482
SAW ADAPTER
Filed April 6, 1932    2 Sheets-Sheet 1
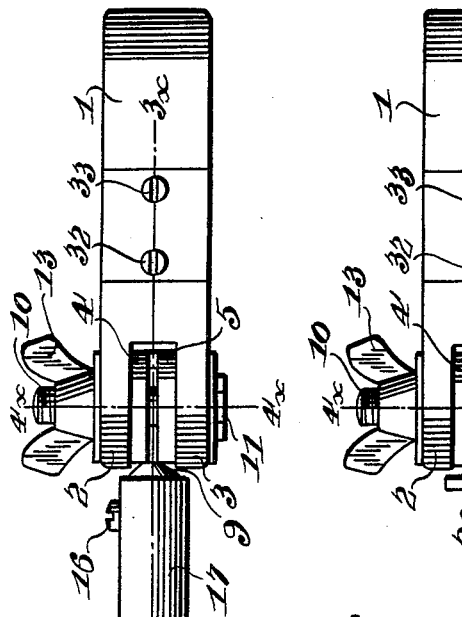
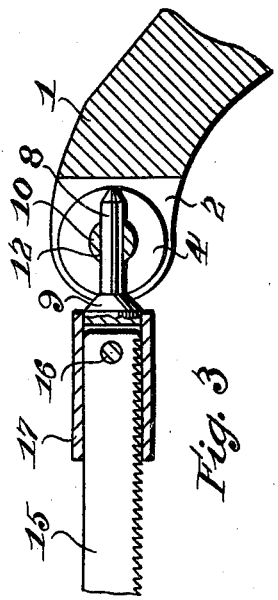
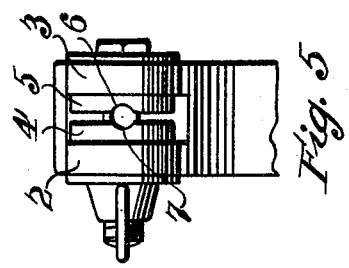
Inventor
Abel A. Magri
By Frank Kiefer
Attorney

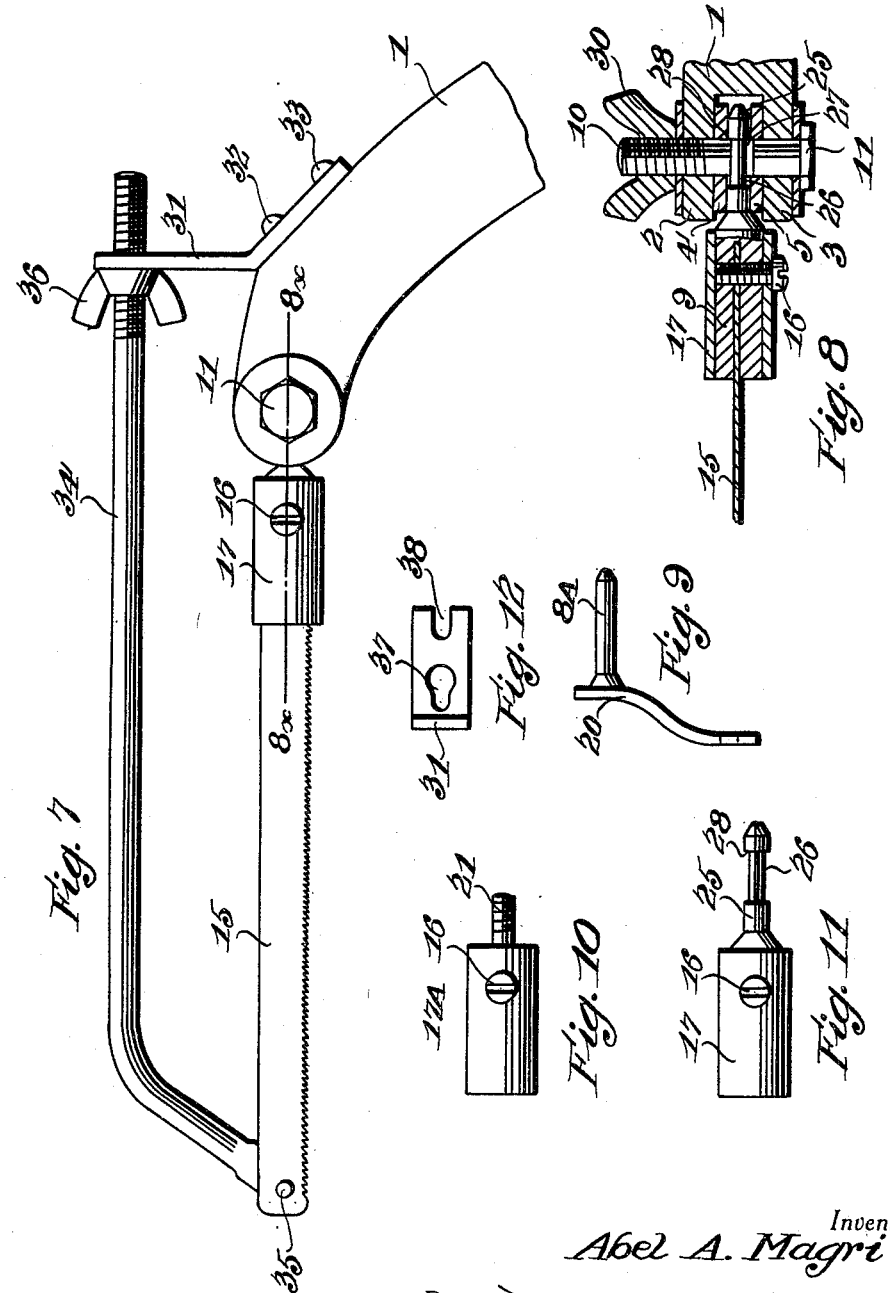

Patented Apr. 25, 1933

1,905,482

UNITED STATES PATENT OFFICE

ABEL A. MAGRI, OF ROCHESTER, NEW YORK

SAW ADAPTER

Application filed April 6, 1932. Serial No. 603,619.

The object of this invention is to provide a new and improved form of saw adapter.

Another object of the invention is to provide a mount for a saw blade which will permit it to be held in a variety of positions with reference to the handle by which it is operated.

These and other objects of the invention will be illustrated in the drawings, described in the specification, and pointed out in the claims at the end thereof.

In the drawings:

Figure 1 is a top plan view of the saw and handle, including my improved adapter.

Figure 2 is a top plan view of the saw and handle and the adapter, to which is added the offset bracket.

Figure 3 is a section on the line 3x—3x of Figure 1.

Figure 4 is a section on the line 4x—4x of Figures 1 and 2.

Figure 5 is an end elevation of the upper end of the handle shown in Figures 1, 2 and 3, with the adapter removed.

Figure 6 is a top plan view of the adapter with the sleeve removed.

Figure 7 is a side elevation of the hack saw, embodying my improved adapter.

Figure 8 is a section on the line 8x—8x of Figure 7.

Figure 9 is a detail view of the offset bracket shown in Figure 2.

Figure 10 is a detail view of the adapter and sleeve used in connection with Figures 2 and 9.

Figure 11 is a detail view of the adapter and sleeve shown in connection with Figures 7 and 8.

Figure 12 is a top plan view of the upright bracket shown in the handle in Figure 7.

In the drawings like reference numerals indicate like parts.

In the drawings, reference numeral 1 indicates the handle of the saw. This handle at the upper end is forked as shown at 2 and 3. Between the forked ends 2 and 3 are placed the washers 4 and 5. These washers are cut away to form the radial recesses 6 and 7, which together form an opening which is adapted to receive the stem 8 of the adapter 9. A stud 10 passes through the forked ends 2 and 3 of the handle 1. This stud has a head 11 on the end thereof. This stud is perforated as indicated at 12 to receive the stem 8. A wing nut 13 is provided on the end of the stud, by which the parts are all clamped together so as to hold the adapter 9 and stem 8 firmly in place.

The adapter is slotted as indicated at 14, and is adapted to receive a saw blade 15. Surrounding the adapter is provided a sleeve 17. The screw 16 passes through the sleeve, and adapter, and the saw blade, by which the parts are all held together firmly in position.

As shown in Figures 2 and 9, I provide an offset bracket 20 having a stem 8A thereon similar to the stem 8, and used for the same purpose. The outer end of this bracket is perforated to receive the threaded end 21 of the adapter shown in Figure 10. A wing nut 22 is shown in Figure 2, that is adapted to engage the threaded stem 21 and clamp it in position on the bracket 20. A sleeve 17A surrounds the adapter, and the adapter and saw blade are clamped therein by means of a screw, as heretofore described.

In Figure 8 I have shown a modified form of the connections at the upper end of the handle in which the adapter is provided with a stem 25 which is cut away as shown at 26 to form an annular recess. This stem engages between the washers 4 and 5, and passes through an opening 27 in the stud 10. The annular recess leaves a shoulder 28 on the stem 25, which shoulder becomes offset from the opening in the stud 10 and forms a positive engagement with the stud, holding the adapter more securely in place in the handle when the wing nut 30 is tightened up.

On the back of the handle is provided an upright bracket 31, which is fastened to the handle by two screws 32 and 33. A brace rod 34 is provided, which engages with the saw blade 15 at the forward end, as indicated at 35. A thumb nut 36 is provided on the threaded end of the rod 34, and bears against the upright end of the bracket 31.

By turning the thumb nut 36, the brace rod is pushed to the left, drawing the saw blade 15 tight and holding it firmly suspended between the end of the brace rod 34 and handle 1.

As shown in Figure 12, the lower part of the bracket 31 rests against the handle 1, and is provided with an elongated screw hole 37 and a slotted opening 38, through which the screws are adapted to pass, by which the bracket is fastened to the handle 1.

By the use of my adapter, it will be seen that as shown in Figures 1 and 3, the thumb nut 13 can be loosened up, and the blade 15 can be turned on its long axis, so as to place its cutting edge in any desired position with reference to the handle, that is, the saw blade will cut down, or up, or sideways with reference to the handle, according to the position in which it may be clamped.

As shown in Figure 2, the offset bracket may be used for the purpose of offsetting the saw blade from the handle to any desired position in a circle of 360 degrees, and the combination also permits the cutting edge of the saw to be turned up, or down, or sideways, etc. in any of these positions. It also permits the adjustment shown in Figures 1, 2 and 3, in which the adapter and saw can be swung around the stud 10 as an axis, and held in any desired position resulting therefrom.

This adapter permits the use of any kind of a saw blade, and a broken hack saw blade can be used therein very efficiently.

I claim:

1. A saw adapter comprising a handle having a forked end, a stud passing through said forked end, a pair of washers on said stud inside the forked end of the handle, said washers being cut away to form radial recesses therein, which together form an opening, an adapter, a stem on said adapter adapted to engage said opening.

2. A saw adapter comprising a handle having a forked end, a stud passing through said forked end, a pair of washers on said stud inside the forked end of the handle, said washers being cut away to form radial recesses therein, which together form an opening, an adapter, a stem on said adapter adapted to engage said opening, an opening in said stud in which said stem can be engaged.

3. A saw adapter comprising a handle having a forked end, a stud passing through said forked end, a pair of washers on said stud inside the forked end of the handle, said washers being cut away to form radial recesses therein, which together form an opening, an adapter, a stem on said adapter adapted to engage said opening, an opening in said stud in which said stem can be engaged, said adapter being slotted and adapted to receive a saw blade therein, a sleeve surrounding said adapter and saw blade, a screw passing through said sleeve, adapter, and blade, by which the parts are all held together firmly in position.

4. A saw adapter comprising a handle having a forked end, a stud passing through said forked end, a pair of washers on said stud inside the forked end of the handle, said washers being cut away to form radial recesses therein, which together form an opening, an adapter, a stem on said adapter adapted to engage said opening, an opening in said stud in which said stem can engage, said adapter being slotted, and adapted to receive a saw blade therein, a sleeve surrounding said adapter and saw blade, a screw passing through said sleeve, adapter, and blade, by which the parts are all held together firmly in position, said adapter and stem being rotatable in said opening to place the cutting edge of the saw in any desired angular position.

5. A saw adapter comprising a handle having a forked end, a stud passing through said forked end, a pair of washers on said stud inside the forked end of the handle, said washers being cut away to form radial recesses therein, which together form an opening, an adapter, a stem on said adapter adapted to engage said opening, an offset bracket on said stem between the adapter and the stem, said bracket and adapter being rotatable around said stem, said adapter being rotatable on its own axis, and means for clamping the adapter and the bracket separately in any desired position.

In testimony whereof I affix my signature.

ABEL A. MAGRI.